Sept. 5, 1967 G. R. BEST 3,340,381

THERMAL PRINTING WAFER AND METHOD FOR MAKING THE SAME

Filed Oct. 29, 1963

INVENTOR.
Gary R. Best
BY Clarence R. Patty, Jr.
ATTORNEY

United States Patent Office 3,340,381
Patented Sept. 5, 1967

3,340,381
THERMAL PRINTING WAFER AND METHOD FOR MAKING THE SAME

Gary R. Best, Raleigh, N.C., assignor to Corning Glass Works, Corning, N.Y., a corporation of New York Filed Oct. 29, 1963, Ser. No. 319,738
3 Claims. (Cl. 219—541)

This invention relates to electrical resistors and more particularly to a method of forming resistors along the edge of a dielectric substrate, but is in no way limited thereto.

Thin film resistors formed along the edge of a dielectric substrate are useful in connection with microcircuits, thermal printing wafers or like applications. Thin film resistors have heretofore been formed on dielectric substrates by first applying an electroconductive film over the entire general area where the resistor is desired. That portion of the film conforming in shape to the desired resistor is masked by photographic, silk screen or other suitable means, and the exposed portion of the film is removed by sandblasting, chemical etching or the like. Such prior art film removal methods are time consuming, costly, and difficult to control for product uniformity and reproducibility.

It is an object of this invention to provide a thin film resistor and a method of manufacture which overcomes the heretofore noted disadvantages.

Another object of this invention is to provide a rapid method for forming high quality resistors on a substrate edge.

A further object is to provide a precise method of forming a thermal printing wafer.

Broadly according to the instant invention a plurality of resistors may be formed along the edge of a dielectric substrate by providing a flat dielectric substrate having two relatively large planar surfaces, applying a thin continuous electroconductive film to at least a portion of the edge surface of said substrate extending over the adjacent edge area of each of said planar surfaces for a predetermined distance, forming electrical conductors on each of said planar surfaces in contact with said film, and cutting slots into said edge through said film to a depth at least equal to said predetermined distance, thereby forming separate strips of electroconductive film extending from at least one of said conductors on one of said planar surfaces to at least one of said conductors on the other of said planar surfaces.

Additional objects, features, and advantages of the present invention will become apparent to those skilled in the art, from the following detailed description and the attached drawing on which, by way of example, only the preferred embodiment of this invention is illustrated.

Figure 1:
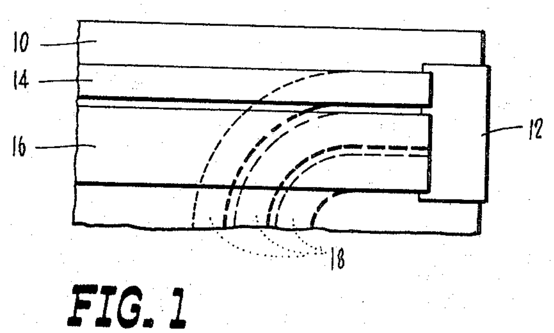
FIG. 1 is a fragmentary elevation of a device formed in accordance with this invention prior to the step of cutting slots in the edge of the substrate.

Referring to FIGURE 1, there is shown a flat dielectric substrate 10 having two relatively large planar surfaces. An electroconductive film 12, of metallic oxide or the like, is deposited along an edge surface and adjacent area of said substrate 10. Suitable substrate materials are glass, ceramics, and the like. For a clear understanding of film 12, its characteristics, and one example of its application, reference is made to U.S. patents, Numbers 2,564,706 and 2,564,707 issued to John M. Mochel.

Electrical conductors 14, 16, and 18 are applied and bonded to the flat surfaces of substrate 10. Film 12 extends over the flat surfaces of substrate 10, adjacent the edge on which resistors are desired, for a distance sufficient to permit electrical conductors 14, 16 and 18 to make suitable electrical contact therewith. Said conductors are formed of copper, aluminum or other suitable electrically conductive materials or metals.

Figure 2:
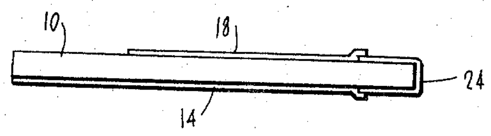
FIG. 2 is a fragmentary plan view of a device formed in accordance with this invention.
Figure 3:
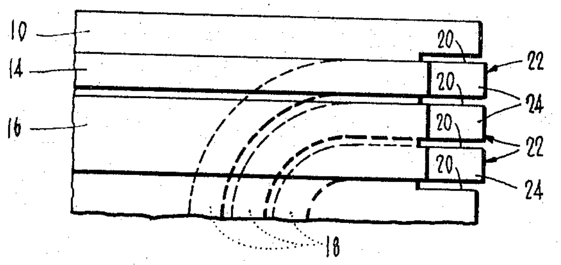
FIG. 3 is a fragmentary elevation of a device formed in accordance with this invention illustrating a plurality of resistors formed at the edge of a substrate.

Referring now to FIGURES 2 and 3, substrate 10 is shown having a plurality of slots 20 cut into one edge thereof for a distance sufficient to completely cut through the electroconductive film. Slots 20 define a plurality of fingers or protruding members 22 along the substrate edge. Each said protruding member has its sides in the same planes as the large planar surfaces of substrate 10. The slots also define a plurality of strips of electroconductive film extending from one side of said members 22 to the other side thereof forming edge resistors 24. Each end of each resistor 24 is in electrical contact with an electrical conductor.

One familiar with the art can readily select suitable means for cutting said slots.

Edge resistors formed in accordance with the hereinabove described method are more economical than those produced by heretofore known methods, have excellent edge definition, and are accurately reproducible. By connecting the electrical conductors to suitable electrical circuitry, the described device may be used as a thermal printing wafer.

Although the present invention has been described with respect to specific details of certain embodiments thereof, it is not intended that such details be limitations upon the scope of the invention except insofar as set forth in the following claims.

I claim:

1. A method of forming a plurality of resistors along the edge of a dielectric substrate comprising the steps of,
  (a) providing a flat dielectric substrate having relatively large first and second planar surfaces,
  (b) applying a thin continuous electroconductive metallic oxide film to at least a portion of the edge surface of said substrate extending over the adjacent edge area of each of said first and second surfaces for a predetermined distance,
  (c) forming at least one electrical conductor in contact with said film on said first surface,
  (d) forming a plurality of electrical conductors in contact witht said film on said second surface, and
  (e) cutting at least one slot into said edge through said film to a depth at least equal to said predetermined distance, thereby forming separate strips of electroconductive metallic oxide film extending from at least one of said conductors on said first surface to at least one of said conductors on said second surface.

2. A method of forming resistors comprising the steps of,
  (a) providing a flat dielectric substrate,
  (b) applying a thin continuous electroconductive metallic oxide film to at least a portion of the edge surface of said substrate extending over the adjacent edge areas of the flat surfaces of said substrate for a predetermined distance,
  (c) forming at least one electrical conductor in contact with said film on one of said flat surfaces,
  (d) forming a plurality of electrical conductors in contact with said film on the other of said flat surfaces, and
  (e) cutting a plurality of slots into said edge through said film thereby forming separate strips of electroconductive metallic oxide film extending from at least one of said conductors on one of said flat surfaces to at least one of said conductors on the other of said flat surfaces.

3. A thermal printing wafer comprising, (a) a flat dielectric substrate having two relatively large planar surfaces, (b) a plurality of protruding members at an edge of said substrate, the sides of said members being in the planes of said surfaces, (c) a strip of thin continuous electroconductive metallic oxide film adhered to each said member extending from one side of said member to the other side thereof, (d) at least one electrical conductor adhered to one of said surfaces in contact with the ends of the strips on said one side, and (e) a plurality of electrical conductors adhered to the other of said surfaces in contact with the ends of said strips on said other side.

References Cited

UNITED STATES PATENTS

| | | | |
|---|---|---|---|
| 2,175,888 | 10/1939 | Flory | 117—107 |
| 2,629,166 | 2/1953 | Marsten et al. | 29—155.71 |
| 3,161,457 | 12/1964 | Schroeder et al. | 346—76 |

FOREIGN PATENTS

| | | |
|---|---|---|
| 1,105,930 | 5/1961 | Germany. |

ALFRED L. LEAVITT, *Primary Examiner.*

WILLIAM L. JARVIS, *Examiner.*